Figure 1:
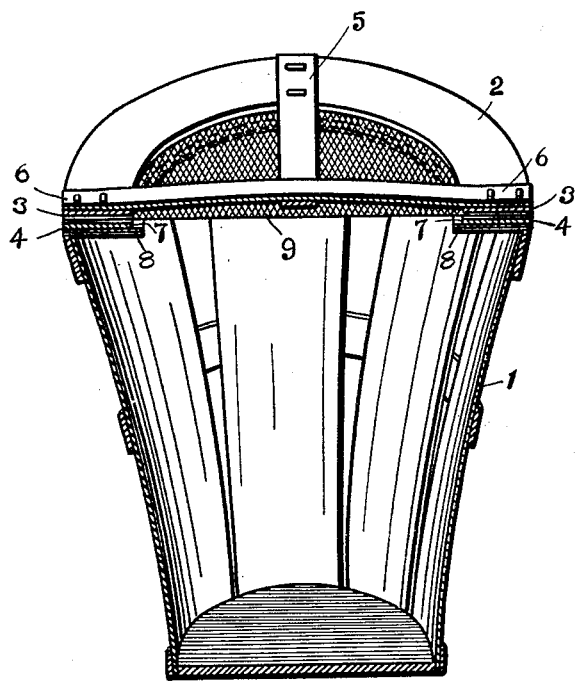

R. P. CLARK.
CUSHION PAD FOR COVERS FOR FRUIT BASKETS.
APPLICATION FILED JAN. 29, 1914.

1,110,043.

Patented Sept. 8, 1914.

UNITED STATES PATENT OFFICE.

RAYMOND PEARCE CLARK, OF ROCHESTER, NEW YORK.

CUSHION-PAD FOR COVERS FOR FRUIT-BASKETS.

1,110,043.  Specification of Letters Patent.  Patented Sept. 8, 1914.

Application filed January 29, 1914. Serial No. 815,215.

*To all whom it may concern:*

Be it known that I, RAYMOND P. CLARK, a citizen of the United States, residing at Rochester, in the county of Monroe and State of New York, have invented certain new and useful Improvements in Cushion-Pads for Covers for Fruit-Baskets, of which the following is a specification.

The object of this invention is to provide a new and useful cushion pad for covers for fruit baskets, which covers have been described in an application heretofore filed by me, Serial No. 743,089.

The cover with which the cushion is preferably used is of annular shape, having an open center and the cushion pad is also annular in shape and projects into the open center of the cover overlapping the inner lower edge of the cover so that when the pad is bent up it will cover the inner sharp edge or corner of the cover and protect the fruit from being cut thereon.

These and other objects of the invention will be fully illustrated in the drawings, described in the specification and pointed out in the claims at the end thereof.

Figure 2:
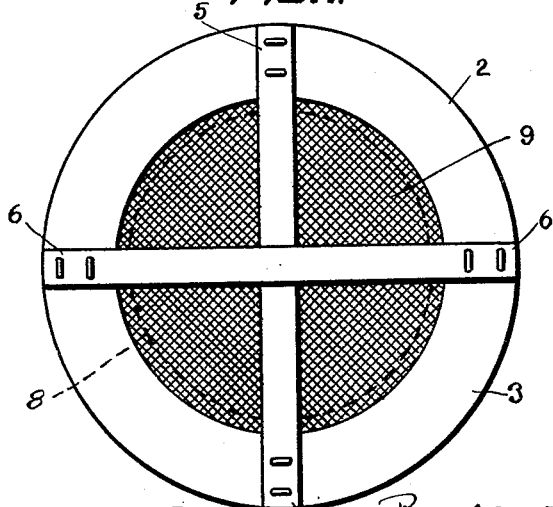

In the accompanying drawings, Figure 1 is a perspective view of a basket and cover and cushion pad in section, the section being taken vertically. Fig. 2 is a plan view of the cover with a cushion pad in position thereon.

In the accompanying drawings like reference numerals refer to like parts.

Reference numeral 1 indicates a peach basket of the ordinary type having a closed bottom and an open top. 2 indicates the cover for covering the top, which cover preferably consists of two annular layers 3 and 4, which embrace between them a strip of tarlatan 9, which covers the open center of the cover and which is transparent so that the fruit can be inspected through it. 5 and 6 are cross pieces which extend diametrically across the cover and across the open center for the purpose of preventing the tarlatan from being broken and for the purpose of protecting the fruit thereunder from being crushed or bruised. The annular layers 3 and 4 are preferably made of wood and are sawed or stamped out in any of the well known ways and when so made are usually left with sharp edges, the lower inner edge of the annular layer 4 being indicated by reference numeral 7.

To protect the fruit in the basket against being cut by this sharp corner I provide the cushion pad 8 which is annular in shape and has an opening therein somewhat less than the opening in the annular layers 3 and 4 so that the cushion pad projects inwardly therefrom toward the center. It can project outwardly under the annular layer 4 as far as may be desired and is shown in the drawings as extending substantially to the outer edge thereof. The cushion pad and the annular layer to which it is attached are arranged relatively to each other so that the pad extends inwardly therefrom about a quarter of an inch, effectually covering the lower inner edge of the cover and protecting the fruit therefrom.

For shipment these baskets are put together in pairs, one basket being inverted on top of another. The two baskets may be fastened together or left loosely in this position, the baskets being usually arranged thus, four tiers high when shipped in cars. When the basket is inverted, the fruit largely rests upon and is supported by the cover. The fruit of course rests upon the cushion pad when the basket is inverted and tends to bend down the inner exposed edge of the pad which then assumes a rounding shape on which the fruit can safely rest without being injured.

It will be understood that this pad can be attached to any annular cover whether it is made up of one layer or two or more layers, the essential feature of it being that it shall be placed over the exposed edge and protect the fruit from being cut thereon and help to support and protect the fruit when the basket is inverted or protect the fruit when the basket is upright.

I claim:

1. A cover for a fruit basket consisting of an annulus of sufficient width to project a substantial distance into the radius of the basket, said annulus having an open center and having an annular cushion pad on its bottom whose radial projection is greater than that of the annulus whereby the cushion extends into the open center of said annulus and past the wall of the central opening thereof.

2. A cover for a fruit basket, consisting of an annulus of sufficient width to project a substantial distance into the radius of the basket, said annulus having an open center and having an annular cushion pad on its bottom, whose inner edge extends past the wall of the opening in the annulus and for a distance into said opening.

In testimony whereof I affix my signature in presence of two witnesses.

RAYMOND PEARCE CLARK.

Witnesses:
ALICE M. JOHANNS,
EDNA K. BOOTH.